US012736740B2

(12) United States Patent
Liu et al.

(10) Patent No.: US 12,736,740 B2
(45) Date of Patent: Sep. 15, 2026

(54) BACKLIGHT MODULE AND BACKLIGHT DEVICE USING THE SAME

(71) Applicant: Darfon Electronics Corp., Taoyuan City (TW)

(72) Inventors: Hsin-Hung Liu, Taoyuan City (TW); Heng-Yi Huang, Taoyuan City (TW)

(73) Assignee: Darfon Electronics Corp., Taoyuan City (TW)

( * ) Notice: Subject to any disclaimer, the term of this patent is extended or adjusted under 35 U.S.C. 154(b) by 0 days.

(21) Appl. No.: 19/318,639

(22) Filed: Sep. 4, 2025

(65) Prior Publication Data

US 2026/0160937 A1 Jun. 11, 2026

Related U.S. Application Data

(60) Provisional application No. 63/728,721, filed on Dec. 6, 2024.

(30) Foreign Application Priority Data

Jun. 20, 2025 (TW) ................................ 114123283

(51) Int. Cl.
*F21V 8/00* (2006.01)

(52) U.S. Cl.
CPC ......... *G02B 6/0076* (2013.01); *G02B 6/0068* (2013.01); *G02B 6/0083* (2013.01); *G02B 6/0091* (2013.01); *G02B 6/0093* (2013.01)

(58) Field of Classification Search
CPC .... G02B 6/0076; G02B 6/002; G02B 6/0075; G02B 27/0983; F21S 41/24; F21S 43/235
See application file for complete search history.

(56) References Cited

U.S. PATENT DOCUMENTS 8,960,980 B2 * 2/2015 Tsai ...................... F21S 41/151 362/555
9,810,833 B2 * 11/2017 Lee ...................... G02B 6/0021

* cited by examiner

*Primary Examiner* — William J Carter

(57) ABSTRACT

The present invention provides a backlight module and a backlight device using the same. The backlight module includes a first light guide plate, a second light guide plate and a light source plate. The first light guide plate includes a first body and a first turning portion. The first turning portion includes a first tail section and a first connecting section. The first connecting section connects the first tail section with the first body, wherein the first tail section overlaps the first connecting section in a direction. The second light guide plate is disposed opposite to the first light guide plate. The light source plate is disposed on the first light guide plate and the second light guide plate. The first direction is substantially perpendicular to an extending direction of the first body.

19 Claims, 10 Drawing Sheets

BACKLIGHT MODULE AND BACKLIGHT DEVICE USING THE SAME

This application claims the benefit of U.S. provisional application Ser. No. 63/728,721, filed Dec. 6, 2024, and the benefit of Taiwan application Serial No. 114123283, filed Jun. 20, 2025, the subject matters of which are incorporated herein by reference.

BACKGROUND OF THE INVENTION

Field of the Invention

The invention relates in general to a backlight module and a backlight device using the same.

Description of the Related Art

Some electronic devices do not emit light themselves, and therefore a backlight module is required to provide illumination. However, due to the structural limitations of the backlight module, the backlight module may usually only emit light from single side, and thus it limits the application field of the backlight module and the electronic device.

SUMMARY OF THE INVENTION

According to an embodiment of the present invention, a backlight module is provided. The backlight module includes a first light guide plate, a second light guide plate and a light source plate. The first light guide plate includes a first body and a first turning portion. The first turning portion includes a first tail section and a first connecting section. The first connecting section connects the first tail section with the first body, wherein the first tail section overlaps with the first connecting section along a first direction. The second light guide plate is disposed opposite to the first light guide plate. The light source plate is disposed on the first light guide plate and the second light guide plate. The first direction is substantially perpendicular to the extension direction of the first body.

According to another embodiment of the present invention, a backlight device is provided. The backlight device includes a carrier and a backlight module disposed on the carrier. The backlight module includes a first light guide plate, a second light guide plate and a light source plate. The first light guide plate includes a first body and a first turning portion. The first turning portion includes a first tail section and a first connecting section. The first connecting section connects the first tail section with the first body, wherein the first tail section overlaps with the first connecting section along a first direction. The second light guide plate is disposed opposite to the first light guide plate. The light source plate is disposed on the first light guide plate and the second light guide plate. The first direction is substantially perpendicular to the extension direction of the first body.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
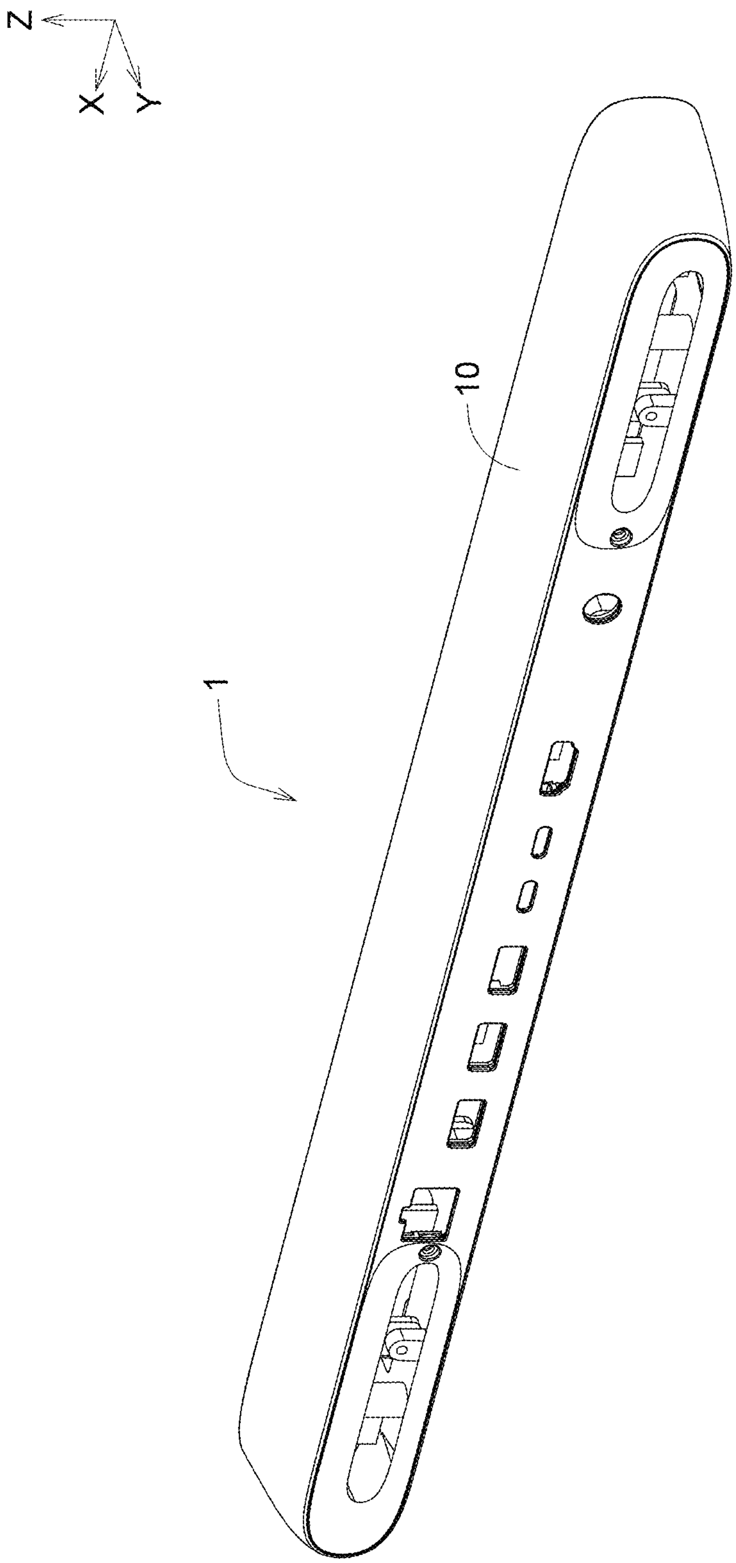
FIGS. 1A and 1B are schematic diagrams of a backlight device according to an embodiment of the present invention at different viewing angles.
Figure 1B:
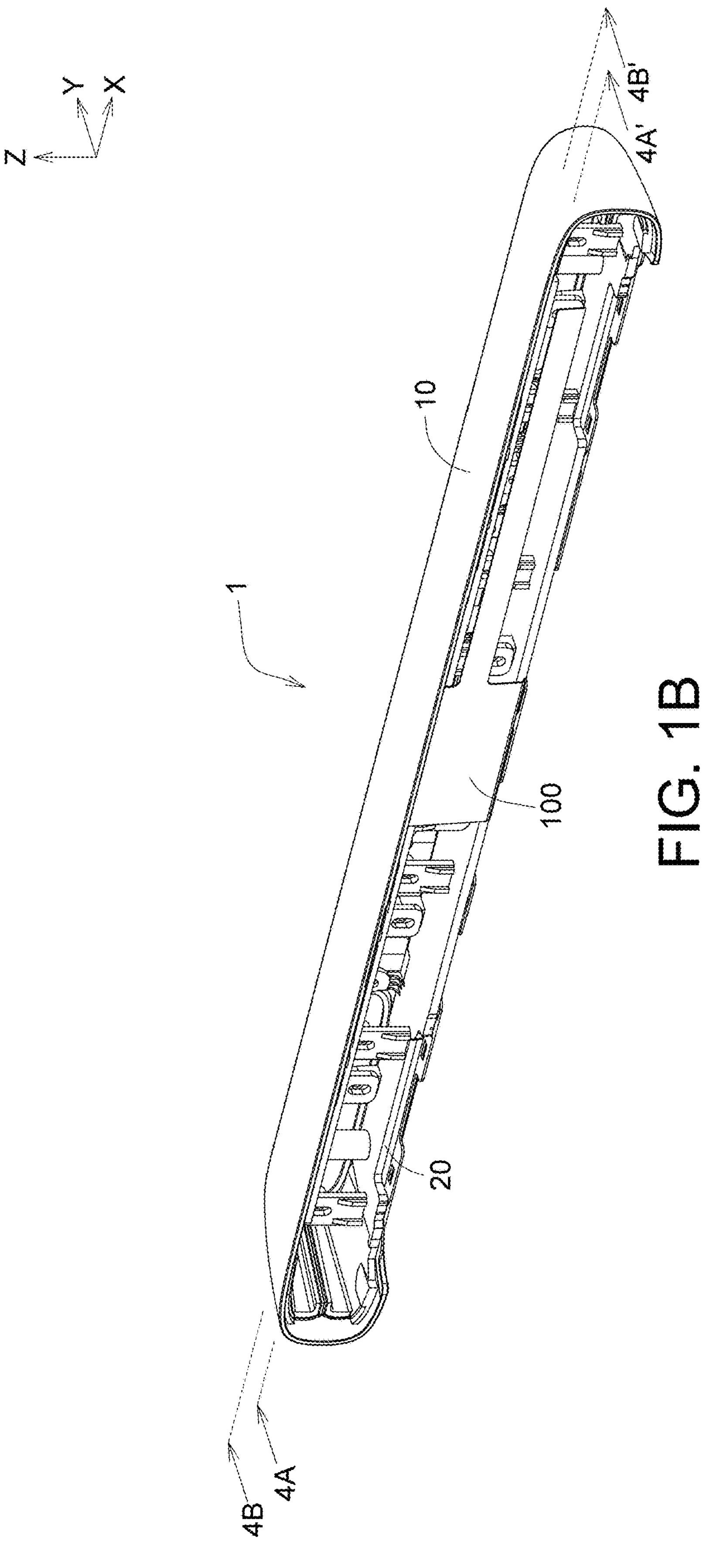
Figure 2:
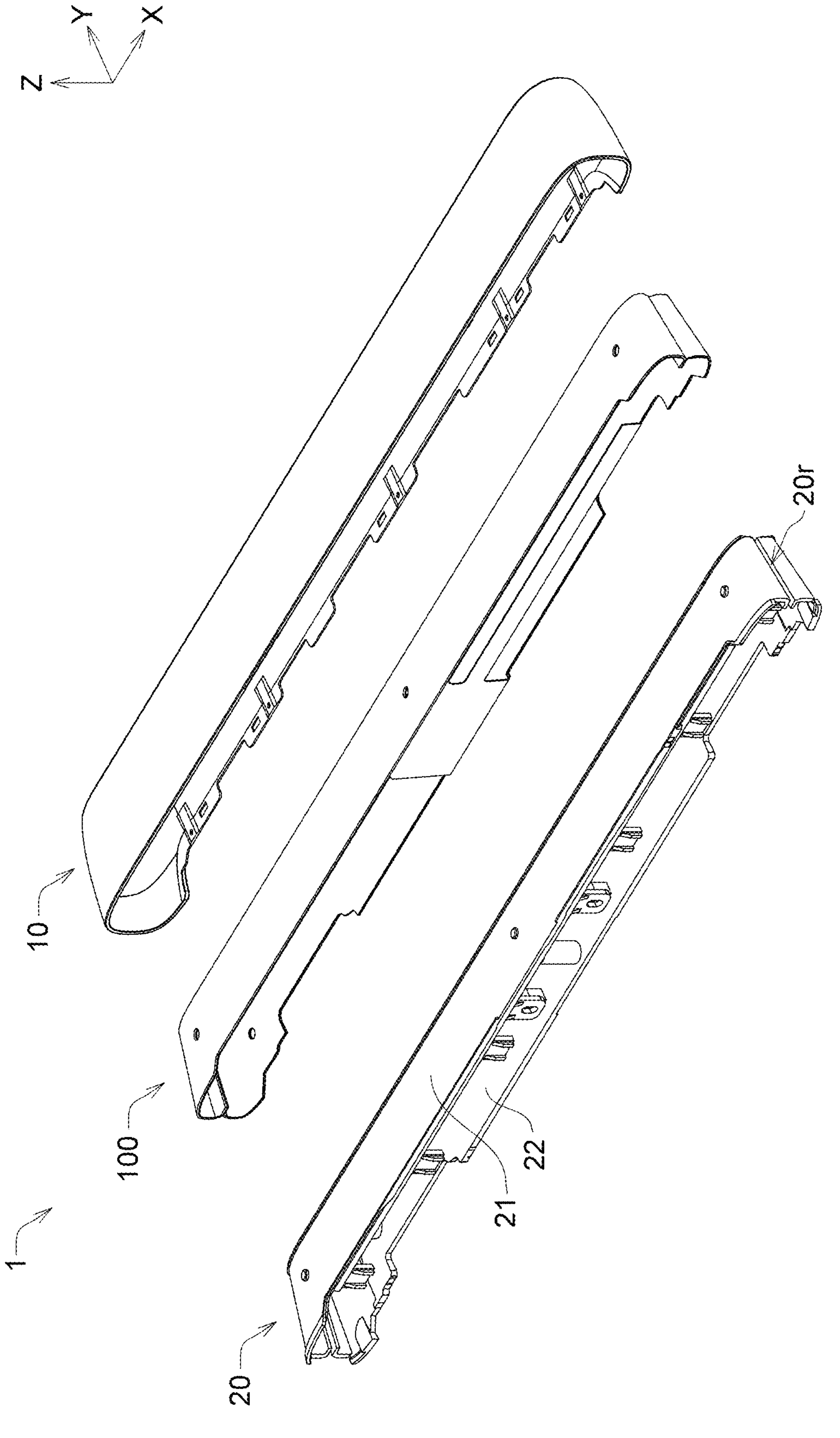
FIG. 2 is a schematic diagram of an exploded view of the backlight device in FIG. 1B.
Figure 3:
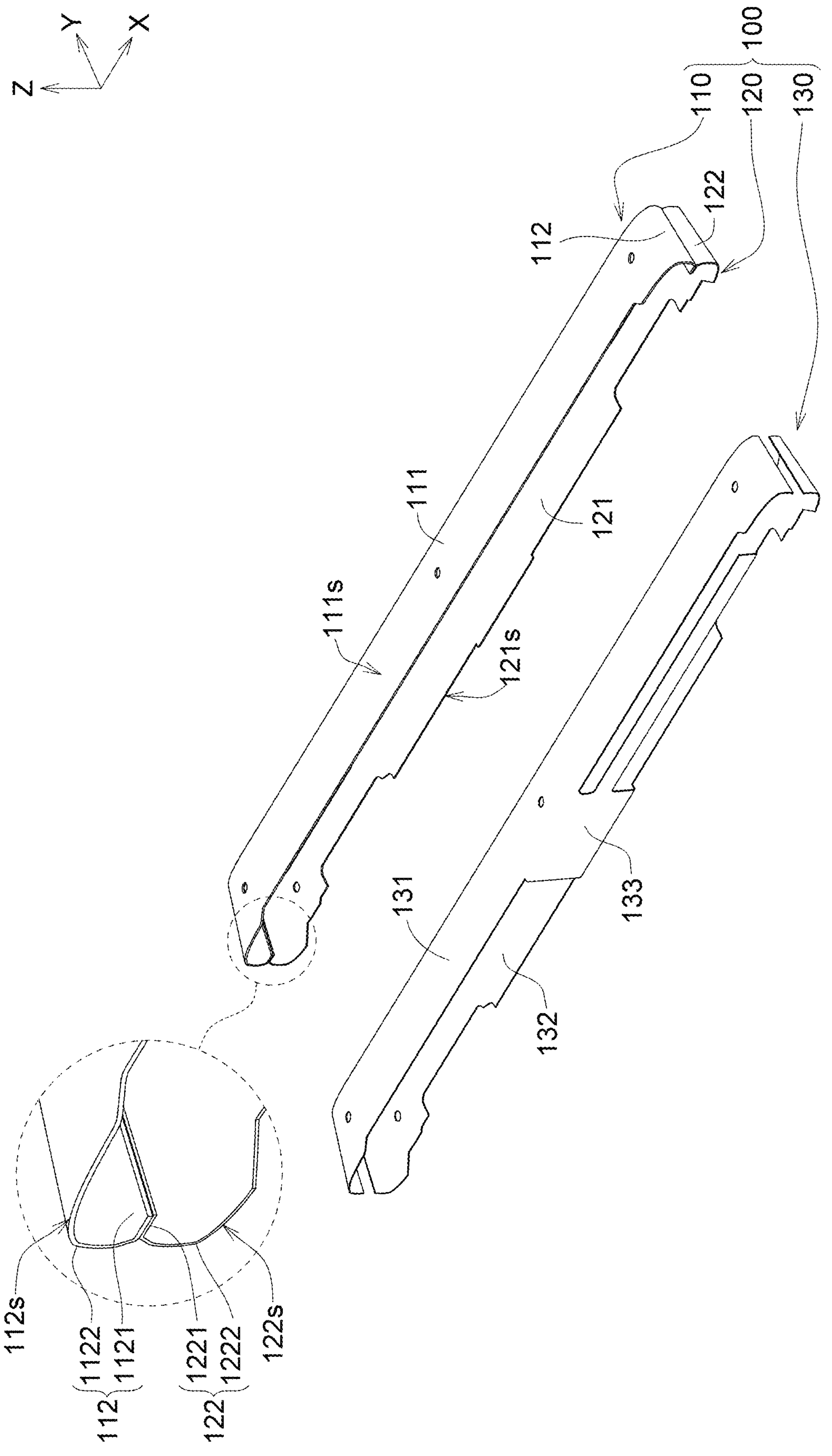
FIG. 3 is a schematic diagram of an exploded view of the backlight module in FIG. 2.

Referring to FIGS. 1A to 3, FIGS. 1A and 1B are schematic diagrams of a backlight device 1 according to an embodiment of the present invention at different viewing angles, FIG. 2 is a schematic diagram of an exploded view of the backlight device 1 in FIG. 1B, and FIG. 3 is a schematic diagram of an exploded view of the backlight module 100 in FIG. 2.

As shown in FIGS. 1A to 3, the backlight device 1 is a modular device that may be assembled in an electronic device to provide illumination. The aforementioned electronic device is, for example, a notebook computer, a display device, a home appliance, or other products that require a light source.

As shown in FIGS. 1A to 3, the backlight device 1 includes a housing 10, a carrier (or inner component) 20, and the backlight module 100. The backlight module 100 is disposed on the carrier 20, and the housing 10 may cover the backlight module 100 and the carrier 20. In an embodiment, the housing 10 and the carrier 20 are, for example, light-transmitting elements, which have a light transmittance between 50% and 100%, for example, 50%, 60%, 70%, 80%, 90%, 100% or other real numbers.

As shown in FIG. 3, the backlight module 100 includes a first light guide plate 110, a second light guide plate 120 and a light source plate 130. The light source plate 130 is disposed on the first light guide plate 110 and the second light guide plate 120. The first light guide plate 110 includes a first body 111 and at least one first turning portion 112. The first turning portion 112 includes a first tail section 1121 and a first connecting section 1122. The first connecting section 1122 connects the first tail section 1121 with the first body 111, wherein the first tail section 1121 at least partially overlaps with the first connecting section 1122 along a first direction Z. In the present embodiment, an overlapping feature of the tail section and the connecting section allows a lateral surface of the backlight module 100 to emit light, thereby increasing a light emission range of the backlight module 100. In addition, since the second light guide plate 120 and the first light guide plate 110 are disposed relative to each other, the backlight module 100 is a multi-faceted light-emitting module. The first direction Z is substantially perpendicular to an extension direction of the first body 111.

In an embodiment, the first direction Z is, for example, parallel to an overlapping direction of the light source plate 130 and the first light guide plate 110, and the extension direction of the first body 111 is, for example, substantially parallel to XY-plane, wherein the first direction Z is substantially perpendicular to XY-plane.

Although not shown, the light guide plates (the first light guide plate 110 and the second light guide plate 120) and the light source plate 130 may be fixed to each other through an adhesive layer. The adhesive layer is, for example, a double-sided adhesive.

Figure 4A:
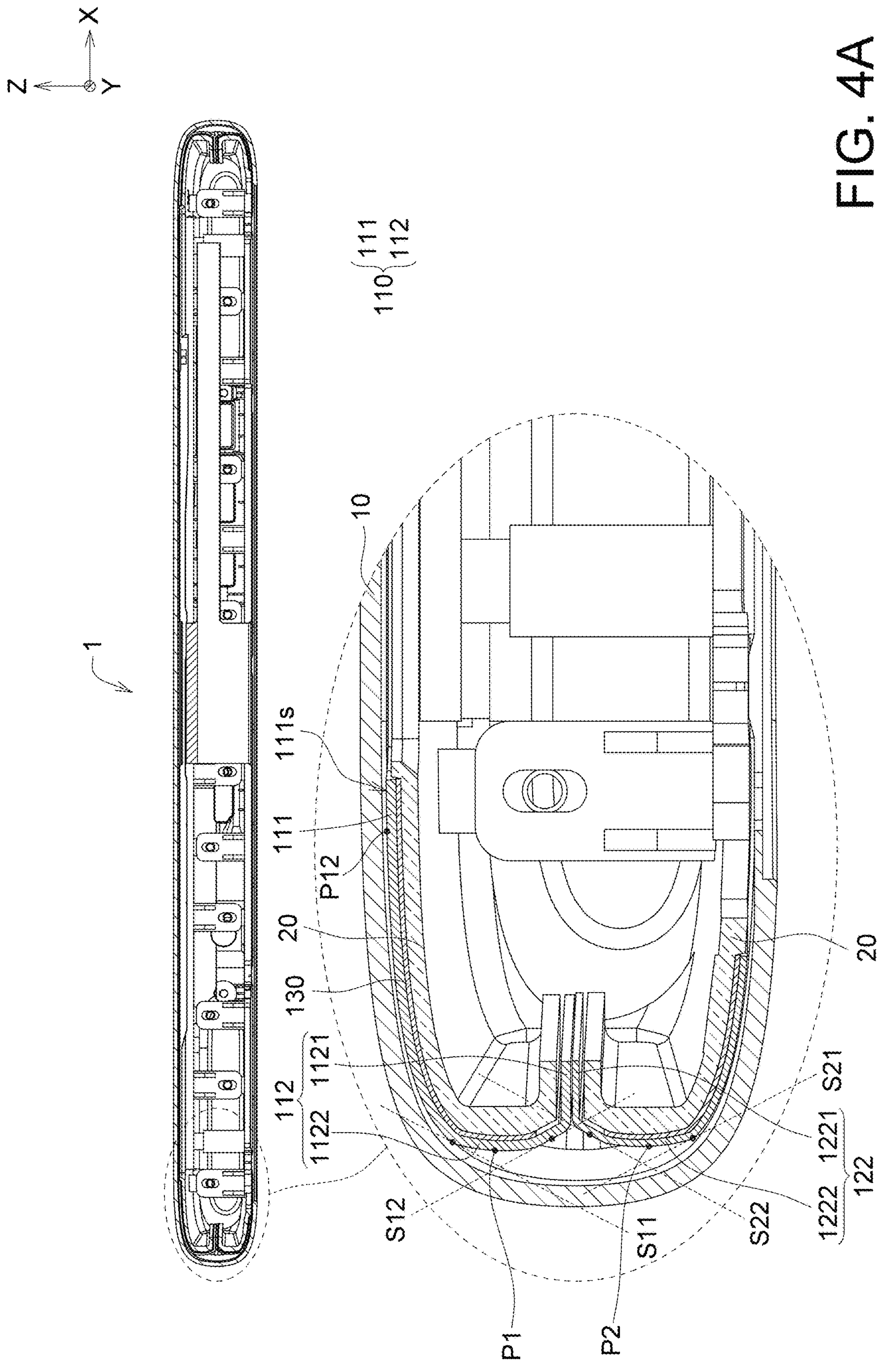
FIG. 4A is a schematic diagram of a cross-sectional view of the backlight device 1 in FIG. 1A along a direction 4A-4A'.
Figure 4B:
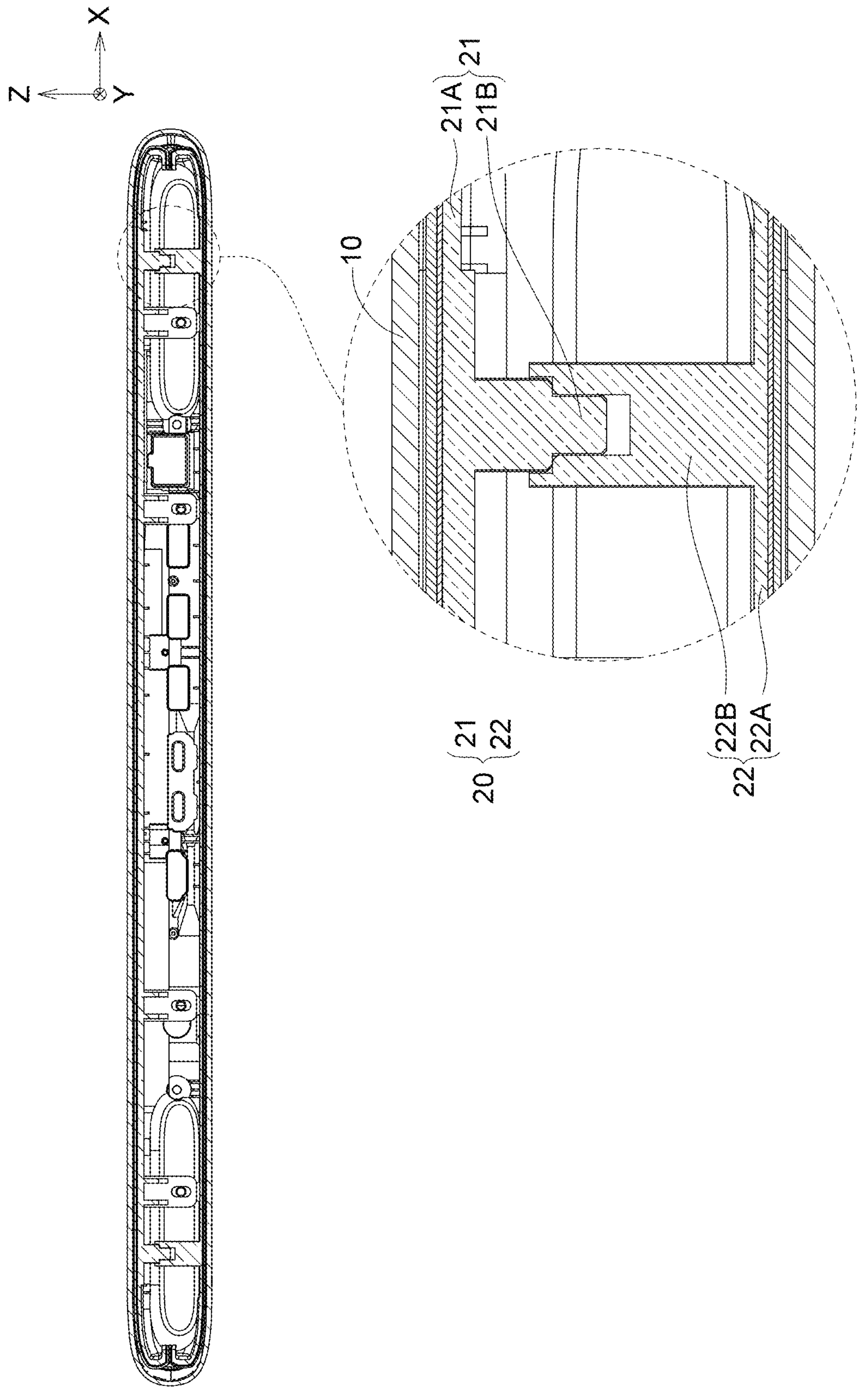
FIG. 4B is a schematic diagram of a cross-sectional view of the backlight device 1 in FIG. 1A along a direction 4B-4B'.

Referring to FIGS. 4A to 4B, FIG. 4A is a schematic diagram of a cross-sectional view of the backlight device 1 in FIG. 1A along a direction 4A-4A', and FIG. 4B is a schematic diagram of a cross-sectional view of the backlight device 1 in FIG. 1A along a direction 4B-4B'.

As shown in FIG. 4A, the first body 111 has a first body surface 111*s*, and the first turning portion 112 has a first turning surface 112*s* (the first turning surface 112*s* is shown in FIG. 3). The first body surface 111*s* has a first radius of curvature, and the first turning surface 112*s* has a second radius of curvature, and the first radius of curvature may be greater than the second radius of curvature. In an embodiment, the entire first body surface 111*s* may be a plane, or a combination of a plane and a curved surface, and the entire first turning surface 112*s* may be a curved surface, or a combination of a plane and a curved surface. As long as the first radius of curvature is greater than the second radius of curvature, the embodiment of the present invention does not limit the geometric shape of the first body surface 111*s* and/or the geometric shape of the first turning surface 112*s*. In an embodiment, the second radius of curvature of the first turning surface 112*s* may ranges, for example, between 1 millimeter (mm) and 1000 mm, such as 5 mm, 10 mm, 100 mm, 200 mm, etc.

As shown in FIG. 4A, the slope of the first connecting section 1122 is one of a positive sign (+) and a negative sign (−), and the slope of the first tail section 1121 is the other of the positive sign and the negative sign (That is, if the slope of the first connecting section 1122 is positive, the slope of the first tail section 1121 is negative; if the slope of the first connecting section 1122 is negative, the slope of the first tail section 1121 is positive). The slope of the first connecting section 1122 of the embodiment of the present invention is illustrated by the positive sign, and the slope of the first tail section 1121 is illustrated by the negative sign (That is, the slope of the first connecting section 1122 is positive and the slope of the first tail section 1121 is negative, for example.). The first connecting section 1122 and the first tail section 1121 are connected at a connecting point P1, and the slope of the connecting point P1 is, for example, infinite (i.e., the tangent of the connecting point P1 is a vertical line). In an embodiment, in the first light guide plate 110, the portion between the connection point P1 and the first body 111 may be defined as the first connection section 1122, and the portion after the connection point P1 (for example, the portion to an end of the first turning portion 112 in FIG. 4A from the connection point P1) may be defined as the first tail section 1121. The aforementioned slope is, for example, the slope of the tangent (as shown by tangent S11 and tangent S12) at any point on the surface of the first connection section 1122 and/or any point on the surface of the first tail section 1121.

As shown in FIG. 4A, the first connection section 1122 is connected to the first body 111 at the connection point P12, and the slope of the tangent at the connection point P12 is, for example, 0, that is, the tangent at the connection point P12 is a horizontal line. In the first light guide plate 110, the portion between the connection point P12 and the connection point P1 is the first connection section 1122.

As shown in FIGS. 3 and 4A, the second light guide plate 120 includes a second body 121 and at least one second turning portion 122. The second body 121 is substantially parallel to the first body 111, but the embodiment of the present invention is not limited thereto. The second turning portion 122 includes a second tail section 1221 and a second connecting section 1222. The second connecting section 1222 connects the second tail section 1221 and the second body 121, wherein the second tail section 1221 at least partially overlaps with the second connecting section 1222 along the first direction Z.

As shown in FIG. 4A, the second body 121 has a second body surface 121*s* (the second body surface 121*s* is shown in FIG. 3), and the second turning portion 122 has a second turning surface 122*s* (the second turning surface 122*s* is shown in FIG. 3). The second body surface 121*s* has a third radius of curvature, and the second turning surface 122*s* has a fourth radius of curvature, and the third radius of curvature is greater than the fourth radius of curvature. In an embodiment, the entire second body surface 121*s* may be a plane, or a combination of a plane and a curved surface, and the entire second turning surface 122*s* may be a curved surface, or a combination of a plane and a curved surface. As long as the third radius of curvature is greater than the fourth radius of curvature, the embodiment of the present invention does not limit the geometric shape of the second body surface 121*s* and/or the geometric shape of the second turning surface 122*s*. In an embodiment, the fourth radius of curvature may range, for example, between 1 mm and 1000 mm, such as 5 mm, 10 mm, 100 mm, 200 mm, etc.

In an embodiment, the first radius of curvature and the third radius of curvature may be different or equal and/or the second radius of curvature and the fourth radius of curvature may be different or equal.

As shown in FIG. 4A, the slope of the second connecting section 1222 is one of the positive sign and the negative sign, and the slope of the second tail section 1221 is the other of the positive sign and the negative sign (That is, if the slope of the second connecting section 1222 is positive, the slope of the second tail section 1221 is negative; if the slope of the second connecting section 1222 is negative, the slope of the second tail section 1221 is positive). In the present embodiment, the slope of the second connecting section 1222 is illustrated by taking the negative sign and the slope of the second tail section 1221 is illustrated by taking the positive sign as an example (That is, the slope of the second connecting section 1222 is negative and the slope of the second tail section 1221 is positive). The second connecting section 1222 and the second tail section 1221 are connected at a connecting point P2, and the slope of the connecting point P2 is, for example, infinite (i.e., the tangent of the connecting point P2 is a vertical line). In an embodiment, in the second light guide plate 120, the portion between the connecting point P2 and the second body 121 may be defined as the second connecting section 1222, and the portion after the connecting point P2 (for example, the portion to an end of the second turning portion 122 in FIG. 4A from the connection point P2) may be defined as the second tail section 1221. The aforementioned slope refers to the slope of the tangent (as shown by tangent S21 and tangent S22) at any point on the surface of the second connecting section 1222 and/or any point on the surface of the second tail section 1221.

In addition, the definition of the second connecting section 1222 is the same as the definition of the first connecting section 1122, and it will not be repeated here.

As shown in FIG. 4A, the first tail section 1121 and the second tail section 1221 may contact each other along the first direction Z; however, in another embodiment, the first tail section 1121 and the second tail section 1221 may be spaced apart from each other along the first direction Z. Alternatively, the first tail section 1121 and the second tail section 1221 may be partially spaced apart and partially contacted along the first direction Z.

As shown in FIG. 3, the light source board 130 includes a first circuit board 131, a second circuit board 132 and a connecting board 133. After the light source board 130, the first light guide plate 110 and the second light guide plate 120 are assembled, the first circuit board 131 overlaps with the first light guide plate 110, and the second circuit board 132 overlaps with the second light guide plate 120, for example, overlaps along the first direction Z, and the first circuit board 131 and the second circuit board 132 are located between the first light guide plate 110 and the second light guide plate 120. The connecting board 133 connects the first circuit board 131 with the second circuit board 132. The connecting board 133 may electrically connect the first circuit board 131 with the second circuit board 132. A signal from a controller (not shown) may be transmitted to one of the first circuit board 131 and the second circuit board 132 through the connecting plate 133 (That is, the signal of the controller may be transmitted to the first circuit board 131 or the second circuit board 132 through the connecting plate 133), and/or a signal of one of the first circuit board 131 and the second circuit board 132 may be transmitted to the controller through the connecting plate 133. In another embodiment, the light source board 130 may omit the connecting plate 133, and the controller controls the first circuit board 131 and the second circuit board 132 respectively, or the signal of the first circuit board 131 and the signal of the second circuit board 132 are transmitted to the controller separately.

In an embodiment, the light source board 130 is, for example, a flexible printed circuit (FPC). For example, at least one of the first circuit board 131, the second circuit board 132 and the connecting plate 133 is a flexible circuit board. In addition, the first circuit board 131, the second circuit board 132 and the connecting board 133 each include a base and at least one circuit (for example, a line, a conductive via, a conductive pad, etc.), wherein the base is, for example, made of polyimide or other types of materials, and the circuit may be formed on the base by using at least one semiconductor process and/or circuit board process. In an embodiment, the base of the first circuit board 131, the base of the second circuit board 132 and the base of the connecting board 133 are, for example, an integrated base. As a result, different light sources are combined through this integrated base, which may ensure that when the light source is disposed on the substrate, the light source board 130 has a consistent brightness and chromaticity level area (bin area), so that there will not be too large color difference (or it can be said to "reduce color difference") between a plurality of portions in the same light source board 130.

Although not shown, the light source board 130 further includes multiple light sources (for example, the light source 234 described later), which may be disposed on the first circuit board 131 and the second circuit board 132. These light sources 234 may be disposed corresponding to the first body 111, the first connecting section 1122 and the first tail section 1121 of the first light guide plate 110 and disposed corresponding to the second body 121, the second connecting section 1222 and the second tail section 1221 of the second light guide plate 120, so that the backlight module 100 becomes a backlight module with annular emitted-light.

As shown in FIG. 4A, the carrier 20 has at least one recessed portion 20*r* (the recessed portion 20*r* is shown in FIG. 2), the first tail section 1121 is at least partially located in the recessed portion 20*r*, and/or the second tail section 1221 is at least partially located in the recessed portion 20*r*. As a result, the recessed portion 20*r* may constrain the first light guide plate 110 and the second light guide plate 120 to prevent the light guide plate and the carrier 20 from being easily separated.

As shown in FIGS. 2 and 4B, the carrier 20 includes a first sub-element 21 and a second sub-element 22, and the first sub-element 21 is connected to the second sub-element 22. The first sub-element 21 includes a third body 21A and at least one first connecting portion 21B, and the first connecting portion 21B is connected to the third body 21A. In an embodiment, the third body 21A and the first connecting portion 21B are, for example, an integrally formed structure. The second sub-element 22 includes a fourth body 22A and at least one second connecting portion 22B, and the second connecting portion 22B is connected to the fourth body 22A. In an embodiment, the fourth body 22A and the second connecting portion 22B are, for example, an integrally formed structure. The carrier 20 is, for example, made of plastic or metal.

As shown in FIG. 4B, the first connecting portion 21B is, for example, a protrusion, and the second connecting portion 22B has, for example, a recess. The first connecting portion 21B may be fixed (for example, by interference fit) to the recess of the second connecting portion 22B for fixing the relative positions of the first sub-element 21 and the second sub-element 22.

Figure 5:
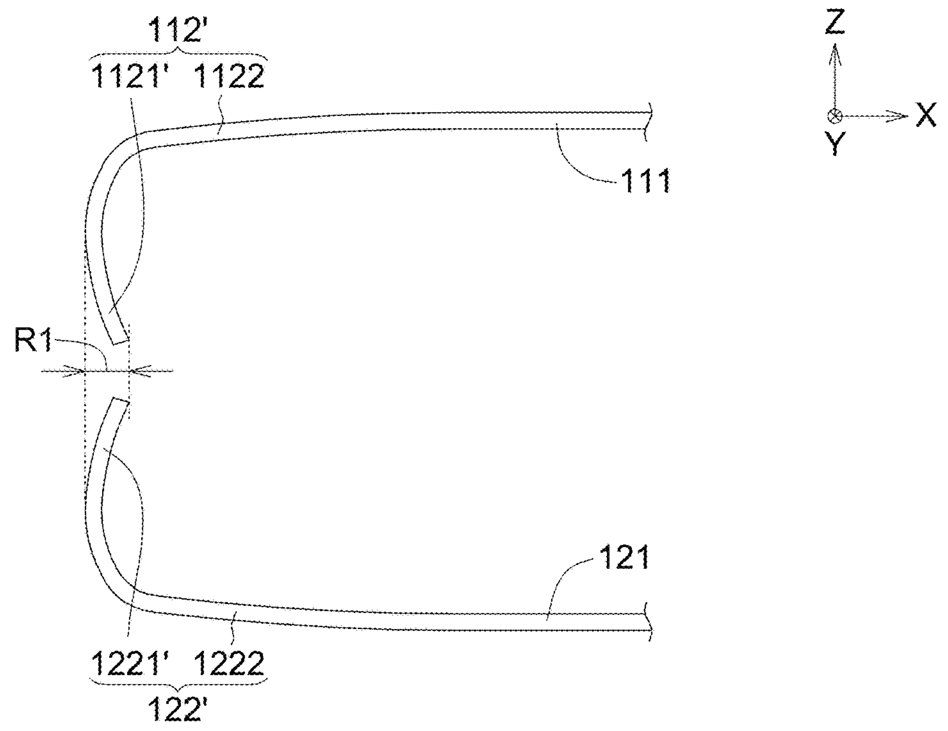
FIG. 5 is a schematic diagram of another embodiment of the first tail section and the second tail section of the backlight device in FIG. 4A.

Referring to FIG. 5, FIG. 5 is a schematic diagram of another embodiment of the first tail section and the second tail section of the backlight device 1 in FIG. 4A.

As shown in FIG. 5, a first turning portion 112' includes a first tail section 1121' and a first connecting section 1122. The first connecting section 1122 connects the first tail section 1121' with the first body 111, wherein the first tail section 1121' at least partially overlaps with the first connecting section 1122 along the first direction Z. The second turning portion 122' includes a second tail section 1221' and the second connecting section 1222. The second connecting section 1222 connects the second tail section 1221' with the second body 121, wherein the second tail section 1221' at least partially overlaps with the second connecting section 1222 along the first direction Z. Compared with the first tail section 1121 and the second tail section 1221 in FIG. 4A, a length of the first tail section 1121' and a length of the second tail section 1221' in FIG. 5 are shorter, so the overlapping area R1 of the first tail section 1121' and the second tail section 1221' along the first direction Z is less. As a result, it may save the material of light guide plate. In addition, the length of the first tail section 1121' and the length of the second tail section 1221' in FIG. 5 may be substantially equal.

Figure 6:
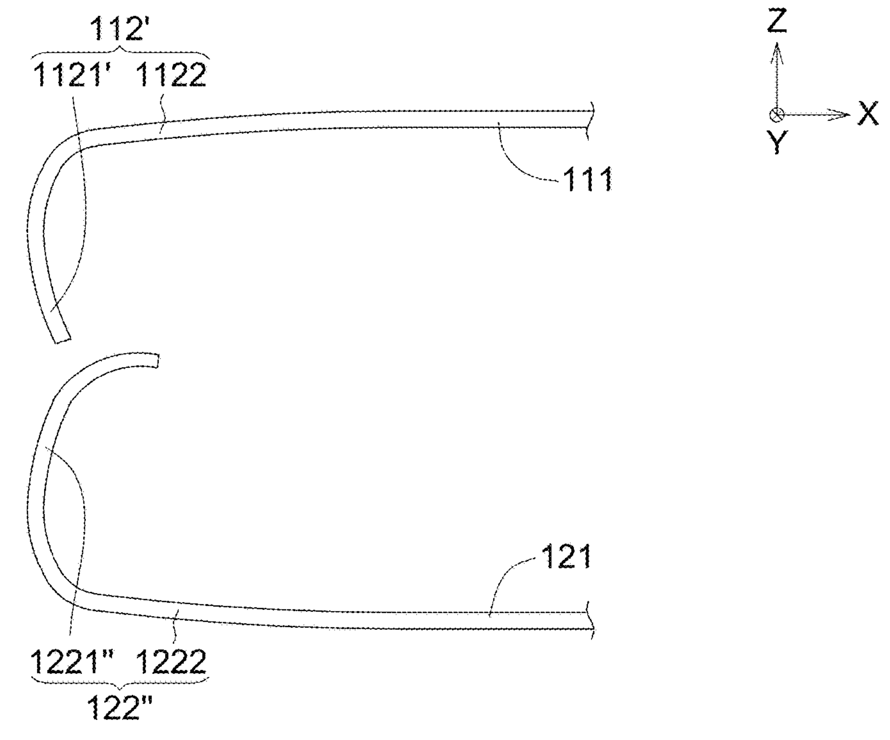
FIG. 6 is a schematic diagram of another embodiment of the first tail section and the second tail section of the backlight device in FIG. 4A.

Referring to FIG. 6, FIG. 6 is a schematic diagram of another embodiment of the first tail section and the second tail section of the backlight device 1 in FIG. 4A.

As shown in FIG. 6, a first turning portion 112' includes the first tail section 1121' and the first connecting section 1122. The first connecting section 1122 connects the first tail section 1121' with the first body 111, wherein the first tail section 1121' at least partially overlaps with the first connecting section 1122 along the first direction Z. A second turning portion 122" includes a second tail section 1221" and the second connecting section 1222. The second connecting section 1222 connects the second tail section 1221" with the second body 121, wherein the second tail section 1221" at least partially overlaps with the second connecting section 1222 along the first direction Z. Compared with the first tail section 1121' and the second tail section 1221" in FIG. 5, the length of the first tail section 1121' and the length of the second tail section 1221" in FIG. 6 are different, and the overlapping area of the second tail section 1221" and the first connecting section 1122 along the first direction Z is greater.

In summary, the first turning portion and the second turning portion at least partially overlap along the first direction Z. For example, the first connecting section of the first turning portion and the second connecting section of the second turning portion at least partially overlap along the first direction Z and/or the first tail section of the first turning portion and the second tail section of the second turning portion at least partially overlap along the first direction Z. For another example, the first tail section and the second connecting section at least partially overlap along the first direction Z and/or the second tail section and the first connecting section at least partially overlap along the first direction Z. In addition, the length of the first tail section and the length of the second tail section may be equal or different. In addition, the first tail section and the second tail section may be spaced apart from each other, or partially in contact and partially spaced apart. In addition, the longer the length of the tail section is, the less the bending stress is and the less the rebound force is.

Figure 7:
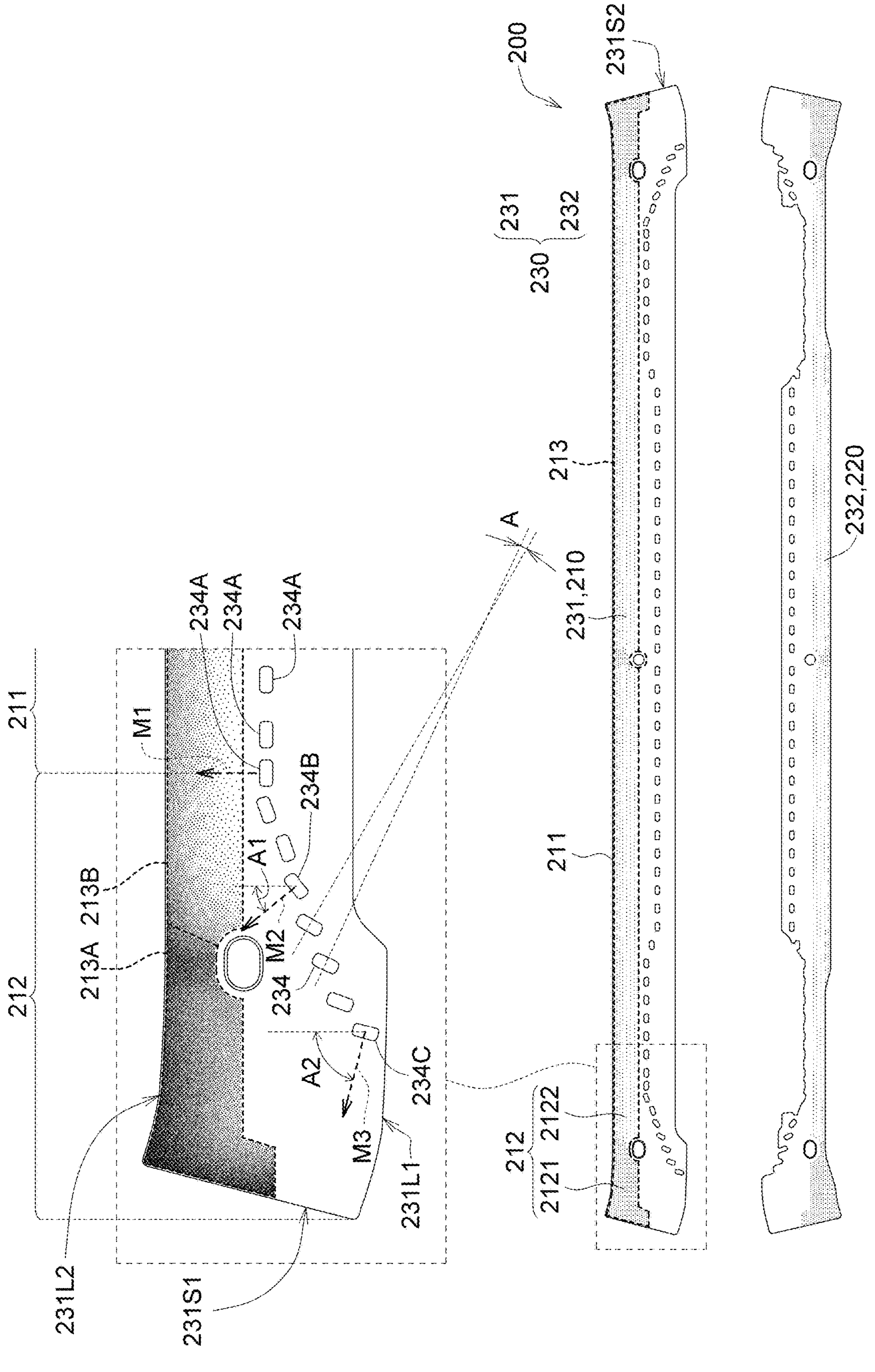
FIG. 7 shows a schematic diagram of an expanded view of a backlight module according to another embodiment of the present invention.

Referring to FIG. 7, FIG. 7 shows a schematic diagram of an expanded view of a backlight module 200 according to another embodiment of the present invention. The backlight module 100 of the backlight device 1 in FIG. 2 may be replaced by the backlight module 200 in FIG. 7.

As shown in FIG. 7, the backlight module 200 includes a first light guide plate 210, a second light guide plate 220 and a light source plate 230. The light source plate 230 includes a first circuit board 231, a second circuit board 232 and a plurality of light sources 234. After the light source plate 230, the first light guide plate 210 and the second light guide plate 220 are assembled, the first circuit board 231 and the first light guide plate 210 at least partially overlap (for example, completely overlap in a direction perpendicular to the paper), and the second circuit board 232 and the second light guide plate 220 at least partially overlap (for example, completely overlap in a direction perpendicular to the paper). In an embodiment, the light source board 230 is, for example, a flexible circuit board. For example, at least one of the first circuit board 231 and the second circuit board 232 is a flexible circuit board. In another embodiment, the light source board 230 may further include the aforementioned connecting board 133, which mechanically and/or electrically connects the first circuit board 231 and the second circuit board 232. Some of these light sources 234 may be disposed on and electrically connected to the first circuit board 231, while other of these light sources 234 may be disposed on and electrically connected to the second circuit board 232.

As shown in FIG. 7, although not shown, the light source 234 may be a side-emitting light source, for example, at least one of all the sides of the light source 234 is a light-emitting surface. In addition, each light source 234 may emit blue light, red light, green light or any combination thereof in proportion, such as white light. Any two of these light sources 234 may emit light of different or same color.

As shown in FIG. 7, each light source 234 has an optical axis, and an acute angle A is included between the two optical axes of two of these light sources 234. For example, the first circuit board 231 has a long edge 231L1 and a long edge 231L2 opposite to the long edge 231L1 and a short edge 231S1 and a short edge 231S2 opposite to the short edge 231S1, and the long edge 231L1 is adjacent to the short edges 231S1 and 231S2. The long edge 231L2 is adjacent to the patterned light shielding layer 213, and the long edge 231L2 is closer to the patterned light shielding layer 213 than the long edge 231L1. In some light sources 234 near the short edge 231S1, an acute angle A is formed between the two optical axes of two light sources 234. In addition, these light sources (for example, the light sources 234B and 234C) having an acute angle A may be disposed on the first turning portion 212 of the first light guide plate 210. These light sources 234A which has no acute angle A may be disposed on the first body 211 of the first light guide plate 210.

As shown in FIG. 7, three of the light sources 234 have a first optical axis, a second optical axis and a third optical axis respectively. There is a first angle included between the second optical axis and the first optical axis, and there is a second angle included between the third optical axis and the first optical axis, wherein the first angle and the second angle are different. For example, the light sources 234 include the light source 234A, the light source 234B and the light source 234C, wherein three of the light sources 234A, 234B and 234C have a first optical axis M1, a second optical axis M2 and a third optical axis M3 respectively, there is a first angle A1 included between the second optical axis M2 and the first optical axis M1, there is a second angle A2 included between the third optical axis M3 and the first optical axis M1, and the first angle A1 and the second angle A2 are different.

As shown in FIG. 7, in some embodiments, the closer the light sources 234 is to the short edge 231S1 of the light source board is, the greater the angle included between the optical axis of such light sources 234 and the first optical axis M1 (its light source 234A is disposed on the first body 211 of the first light guide plate 210) is. For example, the angle between the third optical axis M3 of the light source 234C and the first optical axis M1 of the light source 234A is A2, and the angle between the second optical axis M2 of the light source 234B and the first optical axis M1 of the light source 234A is A1, wherein since the light source 234C having the third optical axis M3 is closer to the short edge 231S1 than the light source 234B having the second optical axis M2, the second angle A2 is greater than the first angle A1. As a result, the postures of these light sources 234 located at the turning portion are coordinated with the turning (for the light source 234B, a different configuration angle is different compared to the light source 234A) to reduce the interference of the light emitted by these light sources 234 (the light sources located at the turning portion).

As shown in FIG. 7, in some embodiments, the closer a light source is to the short edge 231S1 of the light source board 230 is, the closer the light source is to the long edge 231L2. For example, the light source 234C having the third optical axis M3 is closer to the short edge 231S1 than the light source 234B having the second optical axis M2, and thus the light source 234C having the third optical axis M3 is closer to the long edge 231L2 than the light source 234B having the second optical axis M2. As a result, the degree of interference between the output light from these light sources may be reduced.

These light sources 234 near the short edge 231S2 have the technical features same as or similar to that of these light sources 234 near the short edge 231S1, and they will not be repeated here. In addition, as shown in FIG. 7, the first circuit board 231 and/or the first light guide plate 210 are, for example, left-right symmetrical structures, and/or the second circuit board 232 and/or the second light guide plate 220 are, for example, left-right symmetrical structures.

As shown in FIG. 7, in some embodiments, the first light guide plate 210 has a patterned light shielding layer 213 (for example, the dot area shown in the figure). In addition, the patterned light shielding layer 213 is adjacent to the short edge 231S1, the short edge 231S2 and the long edge 231L1. For example, the patterned light shielding layer 213 is adjacent to a portion of the short edge 231S1, a portion of the short edge 231S2 and at least one portion of the long edge 231L1, so that the patterned light shielding layer 213 is biased to one side of the first light guide plate 210. In addition, the area where these light sources 234 are projected onto the first light guide plate 210 (for example, along the direction perpendicular to the paper surface) may not overlap with the patterned light shielding layer 213 at all, or may overlap partially.

As shown in FIG. 7, the patterned light shielding layer 213, for example, includes a plurality of ink dots, wherein the ink dots have a light shielding effect. For example, the ink dots are black ink. The patterned light shielding layer 213 is formed on the first light guide plate 210 by inkjet or coating, for example.

As shown in FIG. 7, the patterned light shielding layer 213 includes a plurality of light shielding particles which are, for example, ink dots. The ink dots are, for example, black ink. The patterned light shielding layer 213 is formed on the first light guide plate 210 by inkjet, coating, etc. In addition, the patterned light shielding layer 213 may be divided into a plurality of regions, and the particle density of these regions may be the same or different. For example, the patterned light shielding layer 213 may be divided into a first region 213A and a second region 213B, the first region 213A has a first particle density, and the second region 213B has a second particle density, wherein the first particle density is different from the second particle density. As a result, the first region 213A is located at the first tail section 2121 of the first turning portion 212, and the second region 213B is located at the first connecting section 2122 of the first turning portion 212.

In an embodiment, the first particle density of the first region 213A is greater than the second particle density of the second region 213B, so that the emitted-light brightness of the tail section region may be uniformized. Furthermore, taking FIG. 4A as an example, the plurality of light sources 234 in FIG. 7 may be disposed in the first tail section 1121 and the second tail section 1221 in FIG. 4A, wherein the light emitted by the light source 234 located on the first tail section 1121 and the light source 234 located on the second tail section 1221 intersect, and it results in an increase in the brightness of the emitted-light. However, since the first particle density of the first region 213A is greater than the second particle density of the second region 213B, the transmittance of such region is reduced, thereby reducing the brightness of the aforementioned intersecting light and making the brightness of the light emitted by the entire light guide plate more uniform.

The second light guide plate 220 includes the technical features same as or similar to that of the first light guide plate 210, and they will not be repeated here.

In addition, although the light source is not shown in FIG. 3, the light source plate 130 in FIG. 3 further includes a plurality of light sources whose features (for example, configuration relationship, etc.) are the same as or similar to those of the light sources 234 of the light source plate 230 in FIG. 7, and they will not be repeated here.

Figure 8:
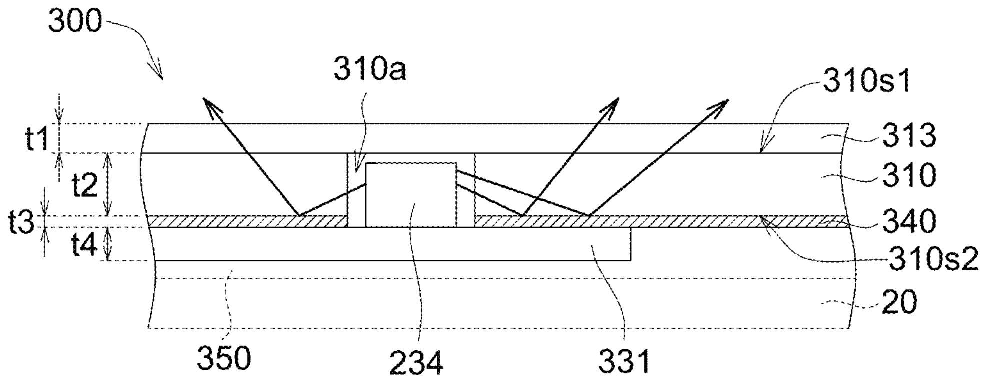
FIG. 8 is a schematic diagram of a partial cross-sectional view of a backlight module according to an embodiment of the present invention.
Figure 9:
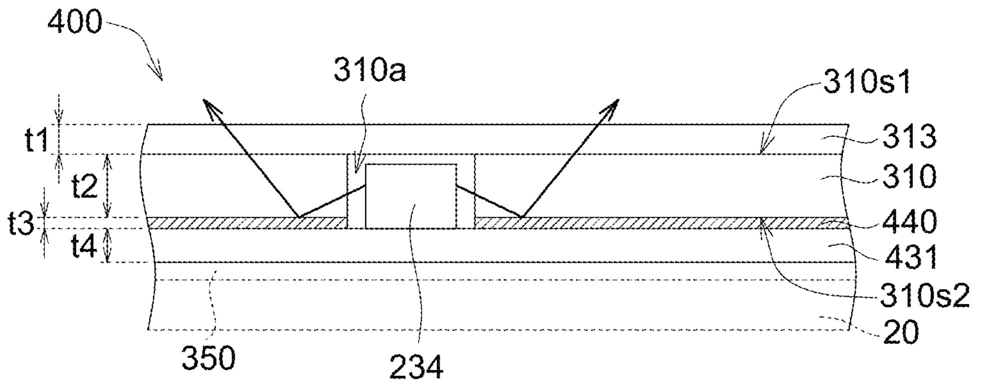
FIG. 9 is a partial cross-sectional view of a backlight module according to another embodiment of the present invention.
Figure 10:
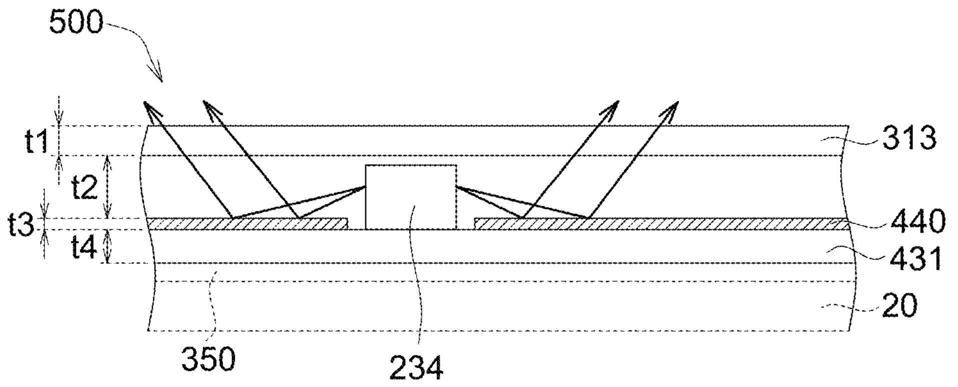
FIG. 10 is a partial cross-sectional view of a backlight module according to another embodiment of the present invention.

Referring to FIGS. 8 to 10, FIG. 8 is a schematic diagram of a partial cross-sectional view of a backlight module 300 according to an embodiment of the present invention, FIG. 9 is a partial cross-sectional view of a backlight module 400 according to another embodiment of the present invention, and FIG. 10 is a partial cross-sectional view of a backlight module 500 according to another embodiment of the present invention.

Any of the aforementioned backlight modules 100 and 200 may have a partial cross-sectional view and corresponding technical features of a backlight module as shown in one of FIGS. 8 to 10.

As shown in FIG. 8, the backlight module 300 may be bonded to the carrier 20 through an adhesive layer 350. The adhesive layer 350 is, for example, a double-sided adhesive tape. The adhesive layer 350 has a thickness being, for example, 0.05 mm. The backlight module 300 at least includes a first circuit board 331, at least one light source 234, a first light guide plate 310, a reflective layer 340 and a gradient film 313. The first light guide plate 310 has a first surface **310*s*1 and a second surface 310*s*2 opposite to the first surface 310*s*1. The gradient film 313 is disposed on the first surface 310*s*1 of the first light guide plate 310, and the reflective layer 340 is disposed on the second surface 310*s*2 of the first light guide plate 310 to reflect the light emitted by the light source 234. The first light guide plate 310 has at least one through hole 310*a*, and the light source 234 may be disposed in the through hole 310*a*. The first circuit board 331 may be disposed on the reflective layer 340. In the present embodiment, the reflective layer 340 may be disposed on the second surface 310*s*2 of the first light guide plate 310 in advance, and then the first circuit board 331 is disposed on the reflective layer 340**.

As shown in FIG. 9, the backlight module 400 may be bonded to the carrier 20 through the adhesive layer 350. The backlight module 400 at least includes a first circuit board 431, at least one light source 234, a first light guide plate 310, a reflective layer 440 and a gradient film 313. The first light guide plate 310 has a first surface **310*s*1 and a second surface 310*s*2 opposite to the first surface 310*s*1. The gradient film 313 is disposed on the first surface 310*s*1 of the first light guide plate 310, and the reflective layer 340 is disposed on the second surface 310*s*2 of the first light guide plate 310 to reflect the light emitted by the light source 234. The first light guide plate 310 has at least one through hole 310*a*, and the light source 234 may be disposed in the through hole 310*a*. The first circuit board 431 may be disposed on the reflective layer 440. In the present embodiment, the reflective layer 440 may be disposed on the first circuit board 431 in advance, and then the first circuit board 431 is connected to the second surface 310*s*2 of the first light guide plate 310 through the reflective layer 440**.

As shown in FIG. 10, the backlight module 500 may be bonded to the carrier 20 through the adhesive layer 350. The backlight module 500 at least includes a first circuit board 431, at least one light source 234, a reflective layer 440 and the gradient film 313. The backlight module 500 includes technical features the same as or similar to the aforementioned backlight module 400, and at least one difference is that the backlight module 500 may omit the first light guide plate 310, that is, there is a space between the gradient film 313 and the reflective layer 440, such as an air layer.

In an embodiment, the thickness t1 of the gradient film 313 shown in FIGS. 8 to 10 is, for example, 0.1 mm, the thickness t2 of the first light guide plate 310 is, for example, 0.3 mm, the thickness t3 of the reflective layers 340 and 440 each is, for example, 0.05 mm, and the thicknesses t4 of the first circuit boards 331 and 431 each is, for example, 0.3 mm.

Figure 11:
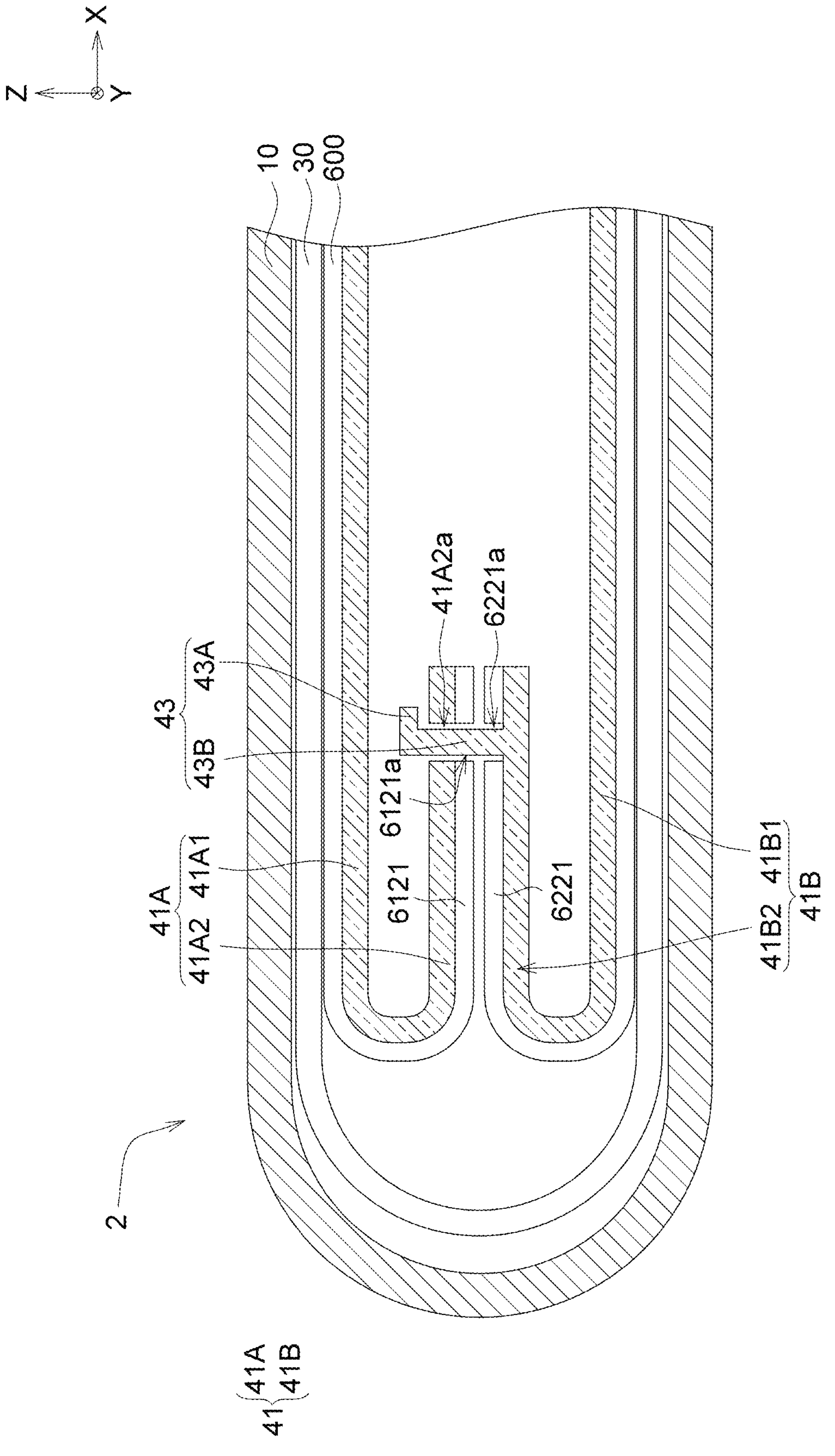
FIG. 11 shows a partial cross-sectional view of a backlight device according to another embodiment of the present invention.

Referring to FIG. 11, FIG. 11 shows a partial cross-sectional view of a backlight device 2 according to another embodiment of the present invention.

As shown in FIG. 11, the backlight device 2 includes the housing 10, a carrier 41, a backlight module 600 and a diffuser 30. The backlight module 600 includes the technical features of any one of the aforementioned backlight modules 100 to 500, or is itself any one of the aforementioned backlight modules 100 to 500. The carrier 41 includes a first sub-element 41A and a second sub-element 41B, and the first sub-element 41A and the second sub-element 41B may be combined with each other to avoid easy separation. The first sub-element 41A includes a third body 41A1 and a third turning portion 41A2, wherein the third turning portion 41A2 is connected to the third body 41A1 and overlaps with the third body 41A1 along the first direction Z. The second sub-element 41B includes a fourth body 41B1 and a fourth turning portion 41B2, wherein the fourth turning portion 41B2 is connected to the fourth body 41B1 and overlaps with the fourth body 41B1 along the first direction Z. A first tail section 6121 of the first light guide plate of the backlight module 600 and a second tail section 6221 of the second light guide plate may be located between the third turning portion 41A2 and the fourth turning portion 41B2.

As shown in FIG. 11, the diffuser 30 covers the backlight module 600. The diffuser 30 may increase the optical performance of the light emitted by the backlight module 600, for example, increase the uniformity of the emitted-light. In addition, the diffuser 30 may also be applied to any of the aforementioned backlight modules 100 to 500.

As shown in FIG. 11, the carrier 41 includes at least one limiting portion 43. The limiting portion 43 includes a first limiting section 43A and a second limiting section 43B, the first limiting section 43A is connected to one of the third turning portion 41A2 and the fourth turning portion 41B2 (In the present embodiment, the first limiting section 43A is connected to the fourth turning portion 41B2, but this is not limited thereto. In another embodiment, the first limiting section 43A may also be connected to the third turning portion 41A2) and substantially extends along the first direction Z, and the second limiting section 43B is connected to the first limiting section 43A and extends along a second direction X, wherein the second direction Z is substantially perpendicular to the first direction X. As a result, the first sub-element 41A and the second sub-element 41B are not easily separated. In addition, the first limiting section 43A passes through a through hole 6221*a* of the second tail section 6221, and a through hole 6121*a* of the first tail section 6121, and a through hole 41Aa of the third turning portion 41A2. A length of the first limiting section 43A along the second direction X is greater than an inner diameter of the through hole 41Aa along the second direction X. As a result, the first sub-element 41A and the limiting portion 43 are not easily separated. In addition, the carrier 20 of the aforementioned embodiment may also be replaced by the carrier 41 of the present embodiment.

In summary, the embodiment of the present invention proposes a backlight module and a backlight device using the same, the backlight module includes at least two light guide plates, each light guide plate includes a body and a turning portion, the turning portion includes a tail section and a connecting section, and the connecting section connects the tail section with the body. In an embodiment, the tail section overlaps with the connecting section along a direction, and such direction is, for example, a stacking direction of the two light guide plates. In another embodiment, the lengths of the two tail sections of the two light guide plates may be equal or different, and/or the lengths of the two connecting sections of the two light guide plates may be equal or different. In another embodiment, the two tail sections of the two light guide plates may at least partially overlap along the stacking direction, and/or the two connecting sections of the two light guide plates may at least partially overlap along the stacking direction. In other embodiments, one of the two light guide plates may omit its tail section. In the present embodiment, the overlapping feature of the tail section and the connecting section allows a lateral surface of the backlight module to emit light, thereby increasing a light emission range of the backlight module.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A backlight module, comprising:
- a first light guide plate, comprising:
  - a first body; and
  - a first turning portion, comprising:
    - a first tail section; and
    - a first connecting section, connecting the first tail section with the first body, wherein the first tail section overlaps with the first connecting section along a first direction;
- a second light guide plate, disposed opposite to the first light guide plate; and
- a light source plate, disposed on the first light guide plate and the second light guide plate;
- wherein the first direction is substantially perpendicular to an extension direction of the first body;
- wherein the first body has a first radius of curvature, the first turning portion has a second radius of curvature, and the first radius of curvature is greater than the second radius of curvature.

2. The backlight module as claimed in claim 1, wherein the second radius of curvature ranges between 1 millimeter (mm) and 1000 mm.

3. The backlight module as claimed in claim 1, wherein a slope of the first connecting section is one of a positive sign and a negative sign, and a slope of the first tail section is the other of the positive sign and the negative sign.

4. The backlight module as claimed in claim 1, wherein the first connecting section and the first tail section are connected at a connection point, and a slope of the connection point is infinite.

5. The backlight module as claimed in claim 1, wherein the light source plate comprises:
- a first circuit board overlapping with the first light guide plate; and
- a second circuit board overlapping with the second light guide plate.

6. The backlight module as claimed in claim 5, wherein the light source plate comprises:
- a connecting board connecting the first circuit board with the second circuit board.

7. The backlight module as claimed in claim 1, wherein the light source plate comprises a plurality of light sources, each of the light sources has an optical axis, and there is an acute angle included between the optical axes of two of the light sources.

8. The backlight module as claimed in claim 1, wherein the light source plate includes a plurality of light sources, three of the light sources have a first optical axis, a second optical axis and a third optical axis respectively, there is a first angle included between the second optical axis and the first optical axis, there is a second angle included between the third optical axis and the first optical axis, and the first angle is different from the second angle.

9. The backlight module as claimed in claim 8, wherein the light source plate has a short edge, the light source having the third optical axis is closer to the short edge than the light source having the second optical axis, the light source having the second optical axis is closer to the short edge than the light source having the first optical axis, and the second angle is greater than the first angle.

10. The backlight module as claimed in claim 9, wherein the light source plate has a long edge connected adjacent to the short edge, the light source having the third optical axis is closer to the long edge than the light source having the second optical axis, and the light source having the second optical axis is closer to the long edge than the light source having the first optical axis.

11. The backlight module as claimed in claim 1, wherein the second light guide plate comprises:
- a second body, substantially parallel to the first body; and
- a second turning portion comprising;
  - a second tail section; and
  - a second connecting section, connecting the second tail section with the second body, wherein the second tail section overlaps the second connecting section along the first direction.

12. The backlight module as claimed in claim 11, wherein the second body has a third radius of curvature, the first turning portion has a fourth radius of curvature, the third radius of curvature is greater than the fourth radius of curvature, and the fourth radius of curvature is different from the second radius of curvature.

13. The backlight module as claimed in claim 11, wherein the second body has a third radius of curvature, the first turning portion has a fourth radius of curvature, the third radius of curvature is greater than the fourth radius of curvature, and the fourth radius of curvature is equal to the second radius of curvature.

14. The backlight module as claimed in claim 11, wherein the first tail section and the second tail section are spaced apart from each other along the first direction.

15. The backlight module as claimed in claim 11, wherein a length of the first tail section is different from a length of the second tail section.

16. The backlight module as claimed in claim 1, wherein the light source plate includes a plurality of light sources, and the first light guide plate has a patterned light shielding layer, and areas where the light sources are projected onto the first light guide plate do not overlap with the patterned light shielding layer at all.

17. The backlight module as claimed in claim 1, wherein the first light guide plate has a first short edge, a second short edge opposite to the first short edge and a long edge connecting the first short edge and the second short edge, the first light guide plate comprises a patterned light shielding layer, and the patterned light shielding layer is adjacent to the first short edge, the second short edge and the long edge.

18. A backlight device, comprising:
- a carrier; and
- a backlight module, disposed on the carrier, and comprises:
  - a first light guide plate, comprising:
    - a first body; and
    - a first turning portion, comprising:
      - a first tail section; and
      - a first connecting section, connecting the first tail section with the first body, wherein the first tail section overlaps with the first connecting section along a first direction;
  - a second light guide plate, disposed opposite to the first light guide plate; and
  - a light source plate, disposed on the first light guide plate and the second light guide plate;
- wherein the first direction is substantially perpendicular to an extension direction of the first body;
- wherein the first body has a first radius of curvature, the first turning portion has a second radius of curvature, and the first radius of curvature is greater than the second radius of curvature.

19. The backlight device as claimed in claim 18, wherein the second light guide plate comprises:
- a second body, substantially parallel to the first body; and
- a second turning portion comprising;
  - a second tail section; and
  - a second connecting section, connecting the second tail section with the second body, wherein the second tail section overlaps the second connecting section along the first direction;
- wherein the carrier comprises:
  - a third body, overlapping with the first body along the first direction;
  - a third turning portion, connected to the third body and overlapping with the third body along the first direction;
  - a fourth body, overlapping with the second body along the first direction; and
  - a fourth turning portion, connected to the fourth body and overlapping with the fourth body along the first direction;
- wherein the first tail section of the first light guide plate and the second tail section of the second light guide plate are located between the third turning portion and the fourth turning portion.

* * * * *